United States Patent
Harron

(10) Patent No.: US 6,911,950 B2
(45) Date of Patent: Jun. 28, 2005

(54) GIMBALLED REFLECTOR MOUNTING PLATFORM

(75) Inventor: Brian A. Harron, Arnprior (CA)

(73) Assignee: Her Majesty the Queen in right of Canada, as represented by the Minister of Industry, through the Communications of Research Centre, Ottawa (CA)

( * ) Notice: Subject to any disclaimer, the term of this patent is extended or adjusted under 35 U.S.C. 154(b) by 6 days.

(21) Appl. No.: 10/752,562

(22) Filed: Jan. 8, 2004

(65) Prior Publication Data

US 2004/0150574 A1 Aug. 5, 2004

Related U.S. Application Data

(60) Provisional application No. 60/443,550, filed on Jan. 30, 2003.

(51) Int. Cl.[7] .................................................. H01Q 3/00
(52) U.S. Cl. ........................ 343/766; 343/765; 343/882
(58) Field of Search ................................. 343/765, 766, 343/878, 882; 342/359

(56) References Cited

U.S. PATENT DOCUMENTS

| | | | |
|---|---|---|---|
| 3,439,550 A | 4/1969 | Goulding | ................... 74/89.15 |
| 4,238,802 A | 12/1980 | Speicher | ..................... 343/765 |
| 4,282,529 A * | 8/1981 | Speicher | ..................... 343/765 |
| 4,332,426 A * | 6/1982 | Speicher | ......................... 384/2 |
| 4,392,140 A | 7/1983 | Bastian et al. | .............. 343/765 |
| 4,691,207 A | 9/1987 | Timineri | ..................... 343/766 |
| 5,227,806 A * | 7/1993 | Eguchi | ........................ 343/765 |
| 6,262,687 B1 * | 7/2001 | Bai et al. | ..................... 343/757 |
| 6,262,688 B1 * | 7/2001 | Kasahara | ..................... 343/766 |
| 6,266,029 B1 * | 7/2001 | Lee et al. | ................. 343/911 L |
| 6,285,338 B1 | 9/2001 | Bai et al. | ..................... 343/882 |
| 6,333,718 B1 * | 12/2001 | Poncel et al. | ............... 343/753 |
| 6,486,845 B2 * | 11/2002 | Ogawa et al. | .............. 343/765 |
| 6,531,990 B2 | 3/2003 | Verkerk | ...................... 343/882 |
| 6,559,806 B1 | 5/2003 | Watson | ....................... 343/766 |
| 6,577,281 B2 * | 6/2003 | Yamamoto et al. | ......... 343/766 |

* cited by examiner

Primary Examiner—Tan Ho
(74) Attorney, Agent, or Firm—Neil Teitelbum; Doug MaCLean; Teitelbaum & MacLean

(57) ABSTRACT

The invention relates to a steerable antenna platform including two independently controllable motors for rotating a flat plate or a parabolic dish antenna about two perpendicular axes. The antenna platform includes a semicircular yoke rotatable about a fixed axes with bearings mounted on either end thereof for pivotally supporting the antenna. The antenna platform also includes a ball joint for supporting the center of the antenna, enabling a reduction in the requirements of the two motors.

15 Claims, 6 Drawing Sheets

GIMBALLED REFLECTOR MOUNTING PLATFORM

CROSS-REFERENCE TO RELATED APPLICATIONS

The present invention claims priority from U.S. patent application Ser. No. 60/443,550 filed Jan. 30, 2003, which is incorporated herein by reference.

TECHNICAL FIELD

The present invention relates to a gimbaled reflector mounting platform, and in particular to a mechanical steering device for a parabolic dish or flat plate antenna for use in such applications as satellite communications or radar systems.

BACKGROUND OF THE INVENTION

Conventional antenna steering devices, such as those disclosed in U.S. Pat. No. 4,691,207 issued Sep. 1, 1987 to Timineri; U.S. Pat. No. 6,285,338 issued Sep. 4, 2001 to Bai et al; and U.S. Pat. No. 6,559,806 issued May 6, 2003 to Watson, include a first motor providing full azimuth rotation (360°) about a vertical axis, and a second motor providing full elevation rotation (90°) about a horizontal axis. In certain applications, e.g. shipboard, maximum range of adjustability is a requirement; however, in instances when the total scan angle requirements are more limited, there are advantages to using less bulky systems. Specifically, the aforementioned fully adjustable systems have a large height profile requiring extra supporting structure, which adds to the complexity and cost of the device. Moreover, the first motor must support the mass of the antenna, as well as the mass of the second motor, which greatly increases the size of the first motor required. Furthermore, the center of gravity of a conventional antenna is usually offset from the pivot points, thereby requiring motors with considerably more torque.

In an effort to solve the aforementioned problems yoke supporting structures have been developed, such as those disclosed in U.S. Pat. No. 3,439,550 issued Apr. 22, 1969 to Goulding; U.S. Pat. No. 4,238,802 issued Dec. 9, 1980 to Speicher; U.S. Pat. No. 4,392,140 issued Jul. 5, 1983 to Bastian et al; and U.S. Pat. No. 6,531,990 issued Mar. 11, 2003 to Verkerk. Unfortunately, when these devices are mounted in any position other than the vertical position illustrated in the patents, the antenna's center of mass would be far from the main support, which results in the base motor having to support the entire mass of the antenna, and, in some cases, the mass of the upper motor, as well. Furthermore, in pulley and wire systems the pull strings are the weakest link, which, when broken, disable the system and potentially cause uncontrolled movement. Relatively complex alternatives have also been developed, but these involve complicated mechanical structures, requiring high manufacturing costs.

An object of the present invention is to overcome the shortcomings of the prior art by providing a relatively simple gimbaled mounting platform with a centrally disposed ball joint for supporting a reflector.

SUMMARY OF THE INVENTION

Accordingly, the present invention relates to a gimbaled reflector mounting device comprising:

a base for supporting the device;

a yoke, rotatable about a first axis, having a first and a second end;

a first motor mounted on the base for rotating the yoke about the first axis;

a reflector pivotally mounted to the first and second ends of the yoke about a second axis;

a second motor mounted on the yoke for rotating the reflector about the second axis;

a universal coupling, supported by the base, disposed at an intersection of the first and second axes for pivotally supporting the reflector.

BRIEF DESCRIPTION OF THE DRAWINGS

The invention will be described in greater detail with reference to the accompanying drawings which represent preferred embodiments thereof, wherein.

DETAILED DESCRIPTION

Figure 5:
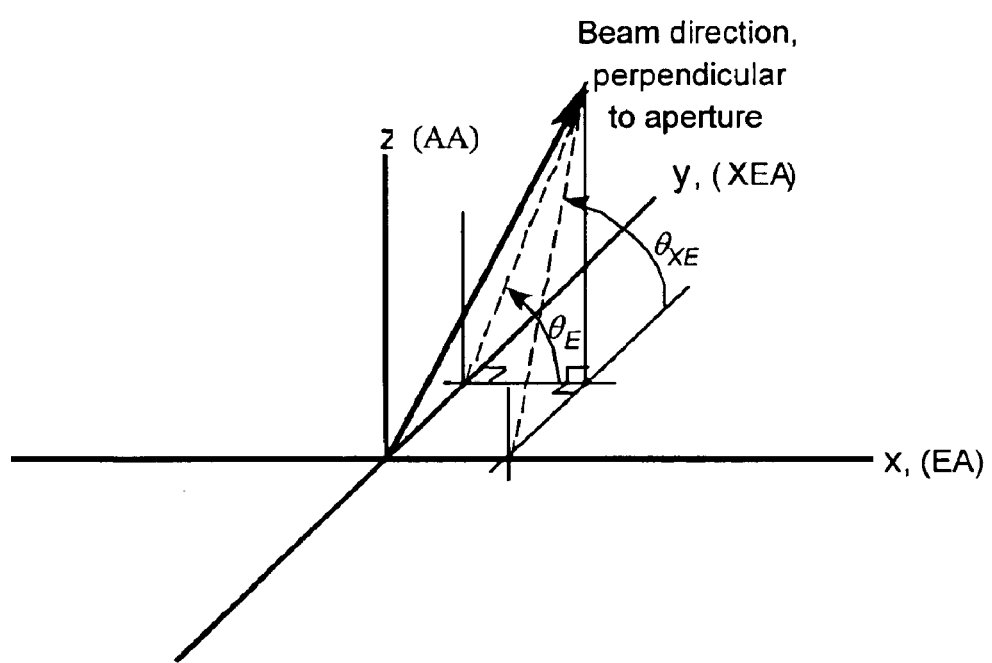
FIG. 5 illustrates a coordinate system for the reflector mounting platform of FIGS. 1 to 4.

The reflector mounting platform according to the present invention includes a semicircular yoke 1 rotatable about a fixed elevation axis EA. Bearings 2 and 3 are mounted on either end of the yoke 1 for pivotally supporting a flat plate (or parabolic dish) reflector 4 about a pivotable cross-elevation axis XEA. With reference to FIG. 5, as the reflector 4 is steered, the transmitted or received beam is steered in a direction perpendicular to the aperture of the reflector 4. An elevation angle $\theta_E$ is measured by rotation about the elevation axis EA (the y axis). Similarly, a cross elevation angle $\theta_{XE}$ is measured by the rotation about the cross-elevation axis XEA (the x axis). In practice the reflector 4 is preferably circular, but any shape, e.g. oval, square, etc, can be used.

Any of the standard feed methods could be used for receiving a signal, e.g. radio frequency signal, collected by the reflector 4 including direct feed and the use of a secondary reflector. If a direct feed (not shown) were used with the reflector 4, it could be attached to a center post assembly or mounted on struts attached to the edge of the reflector 4. Alternatively, a secondary reflector could be used, either centered or offset. With a centered secondary reflector, the feed is mounted on top of the ball joint 11 with a waveguide or coaxial cable leading the radio frequency signal through the reflector 4 to the backside thereof.

An elevation motor 5, positioned on a base 6 directly below the center of the reflector 4, drives gears, which engage teeth 7 on the yoke 1, for rotating the reflector 4 about the elevation axis EA. A cross-elevation motor 8 is disposed on one arm of the yoke 1, proximate the outer free end thereof and adjacent to bearing 2, for rotating the reflector 4 about the cross-elevation axis XEA. A semicircular gear 9, connected to the reflector 4, engages the cross-elevation motor 8, see FIGS. 1 to 3, for rotation of the reflector 4. If a second cross-elevation motor (not shown) is not required, a counterbalancing weight (not shown) can be mounted on the other end of the yoke 4 to balance the weight of the cross-elevation motor 8. Preferably, the motors 5 and 8 are micro-stepping motors providing fine control, with less backlash than with gear reduced drives. Alternatively, analog servo motors could be used.

A pedestal 10 with a universal coupling, such a ball joint 11, on the outer free end thereof, extends upwardly from the cross-elevation motor 8, along an azimuth axis AA perpendicular to the elevation axis EA, for supporting the center of the reflector 4. A semi-spherical indentation 12 is formed in the center of the reflector 4 for receiving the ball joint 11. A mounting collar 13, with an opening only slightly smaller than the diameter of the ball joint 11, is secured to the backside of the reflector 4, sandwiching the ball joint 11 therebetween. To maximize the range of adjustability, the interface between the mounting collar 13 and the reflector 4 lies in a plane that intersects the center of the ball joint 11. The use of other universal couplings such as universal joints is also possible depending upon the amount of swing required.

Preferably, the elevation axis EA extends through the center of semicircular yoke 1, or an arc defined thereby, and through the center of the ball joint 11. In the illustrated embodiment the elevation axis EA is spaced from and substantially parallel to the base 6, and perpendicular to the pedestal 10; however, it is also within the boundaries of this invention to substitute the elevation axis EA with the azimuth axis AA extending from the base 6 up through the pedestal 9, whereby the motor 5 rotates the semicircular yoke 1 around the azimuth axis AA.

Since the bulk of the antenna is supported by the ball joint 11 instead of the yokes or swivels, as in the prior art, the bearings 2 and 3 need not include as large a bearing surface, resulting in a reduction in size and cost.

Furthermore the size of the motors 5 and 8 required to rotate the reflector 4 are relatively small compared to those needed to drive standard mounting systems, which reduces the cost thereof, and reduces the gear and torque related noise generated by the mounting platform. Moreover, electrical power consumption, wire size and cabling can all be reduced, thereby further reducing the cost and complexity of the mounting platform.

The reflector mounting platform according to the present invention is adaptable for use with antenna structures ranging from small to very large. For any size of reflector 4, the mounting platform can be counterbalanced about a central pivot point, defined by the ball joint 11. The ball joint 11 relieves the motors 5 and 8 from moving a mass, which is displaced from its rotation axis. Moreover, the torque requirements on the motors 5 and 8 are reduced, because the center of the mass is close to the center of the ball joint 11.

Figure 1:
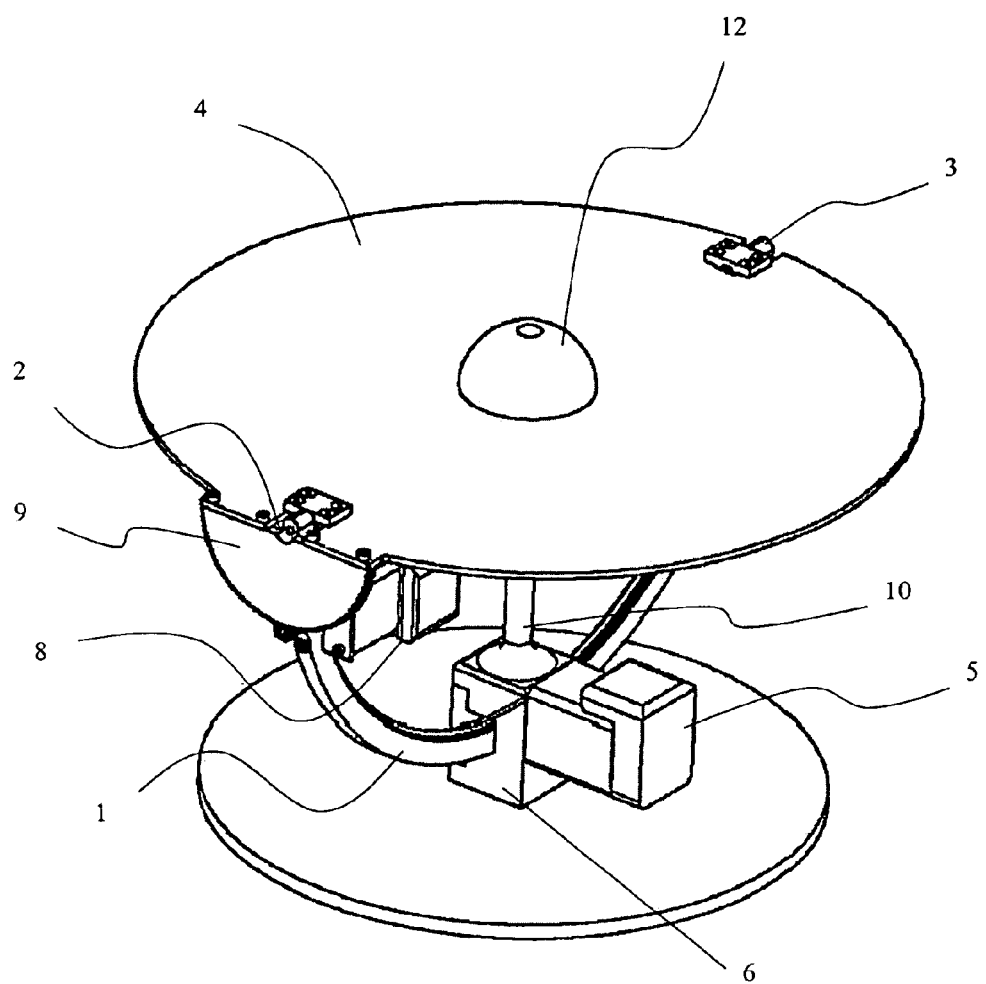
FIG. 1 is an isometric view of the reflector mounting platform according to the present invention.
Figure 2:
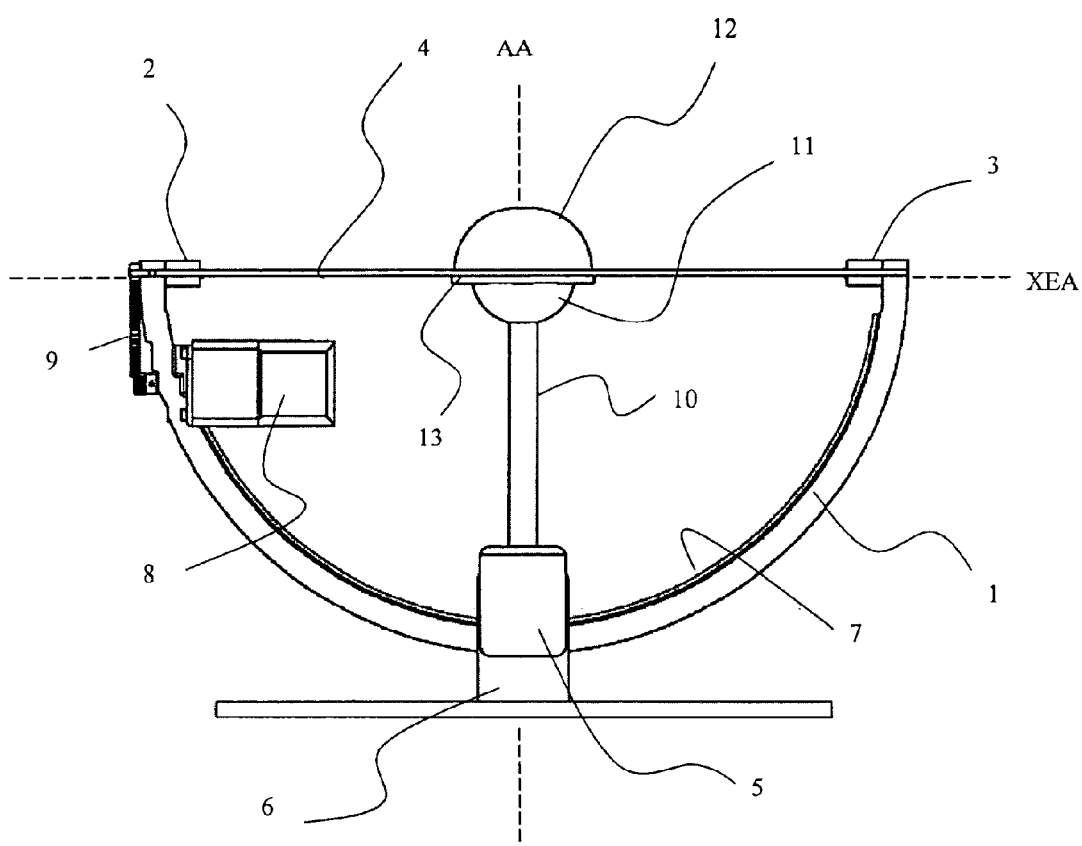
FIG. 2 is a side view of the reflector mounting platform of FIG. 1.
Figure 3:
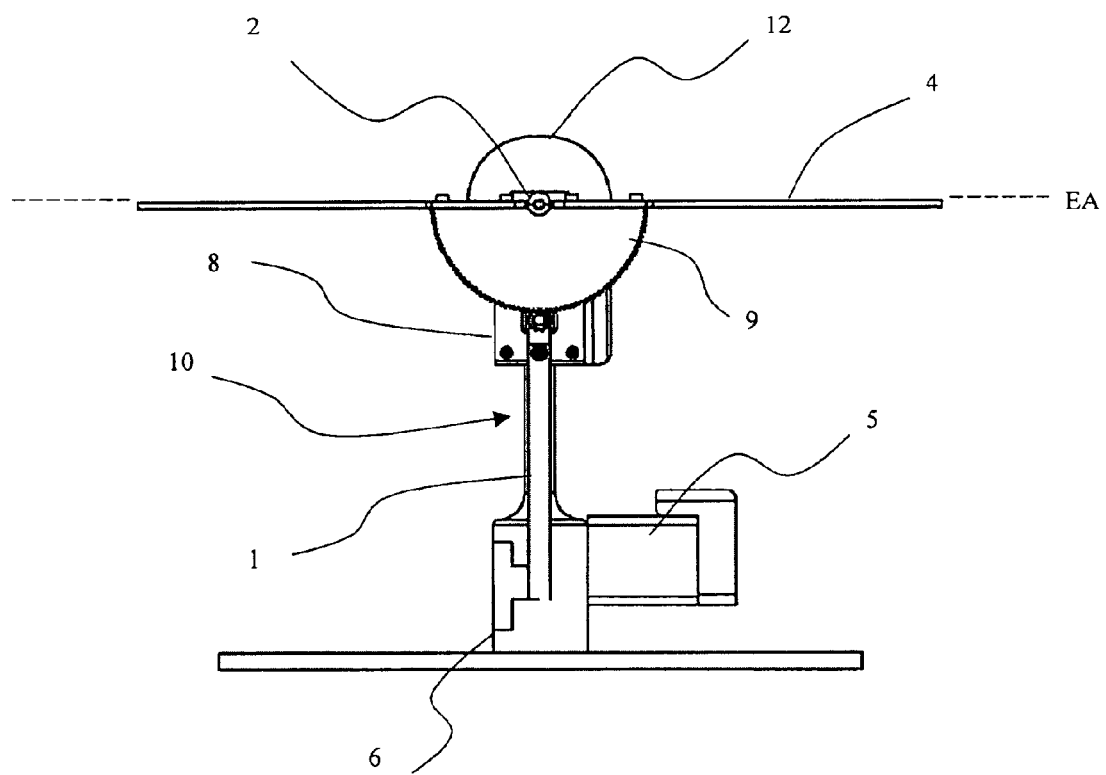
FIG. 3 is an end view of the reflector mounting platform of FIG. 1.
Figure 4:
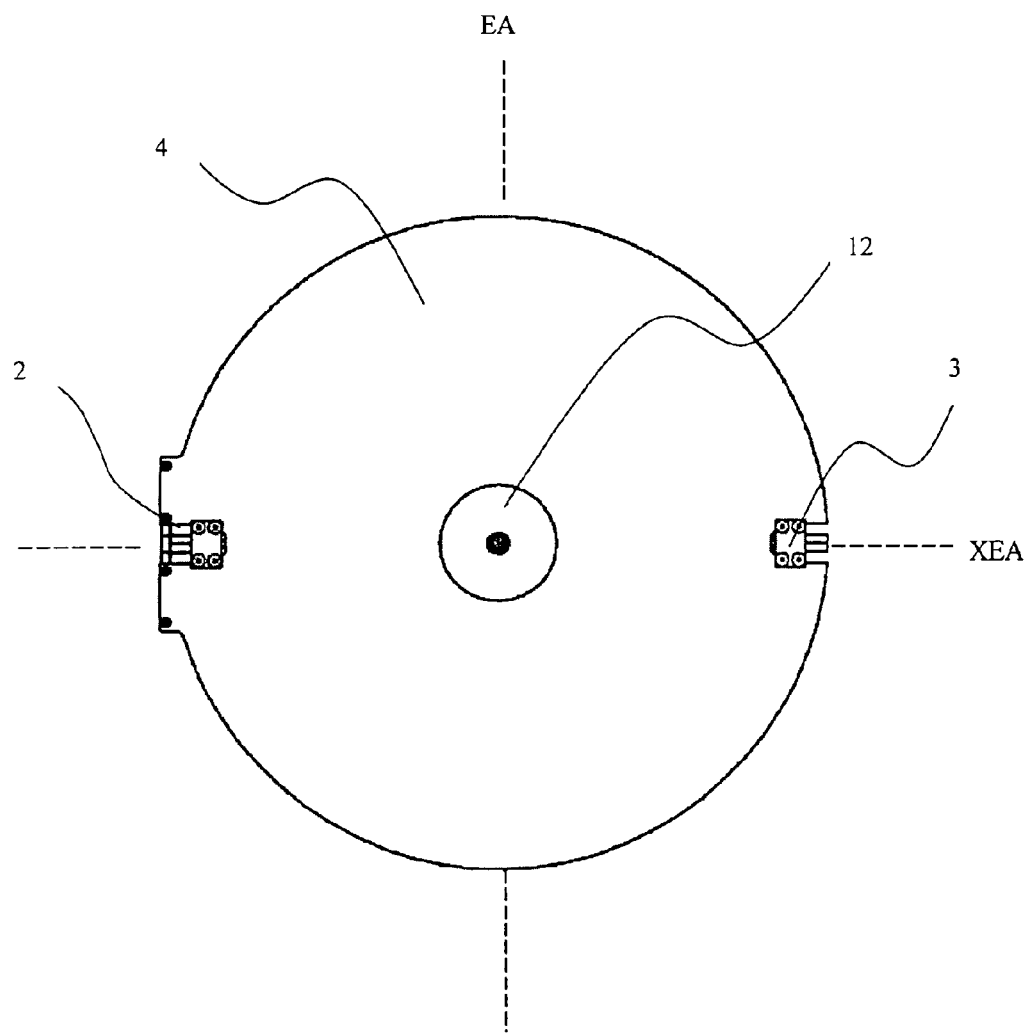
FIG. 4 is a plan view of the reflector mounting platform of FIGS. 1 and 2.

In a resting or horizontal position, see FIGS. 1 to 3, the mounting platform is oriented so that $\theta_E=90°$ and $\theta_{XE}=90°$, i.e. the perpendicular to the aperture of the reflector 4 is pointed in the same direction as the pedestal 9. The range of steering about the resting position depends upon the specific mounting arrangements of the two motors 5 and 8 and the size of the mounting collar 13. In one working example, a displacement in both axes of up to 60° was achieved, i.e. $\theta_E$ and $\theta_{XE}$ both had a range of 90° (resting position) to ±30° from a vertical position, although more careful designs could achieve a range down to ±20° from the vertical position.

Figure 6:
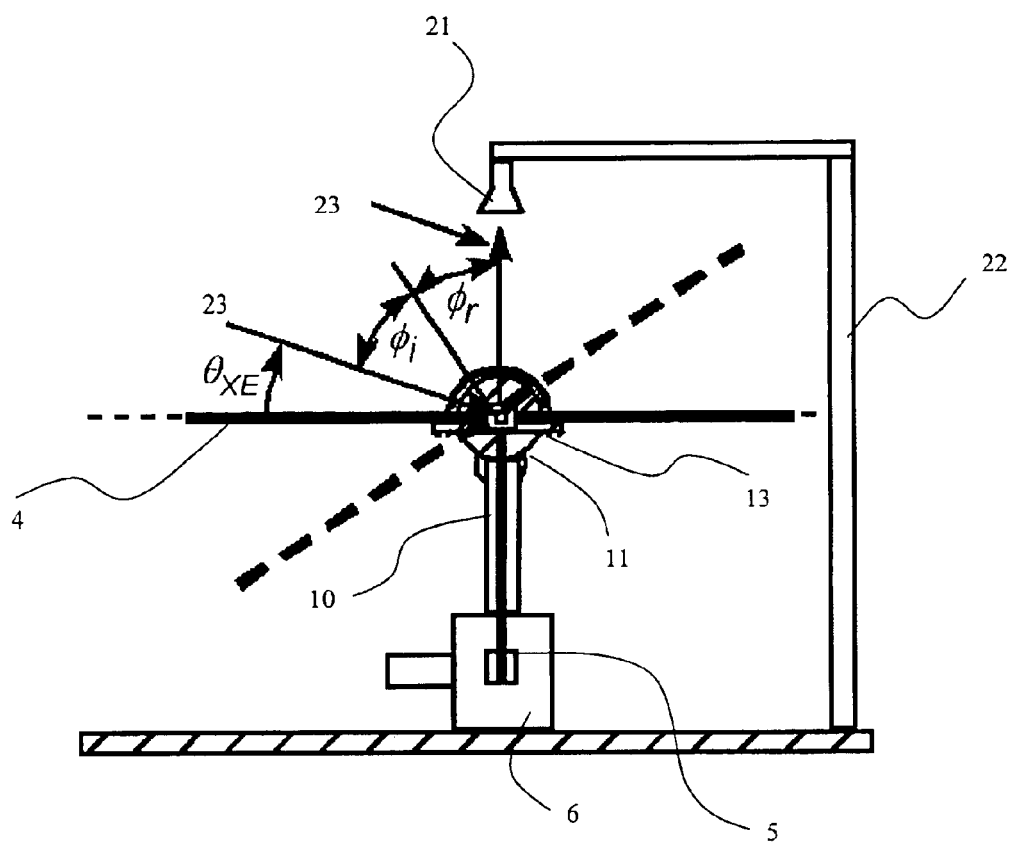
FIG. 6 illustrates an alternative embodiment of the present invention.

An alternative feed mounting arrangement is illustrated in FIG. 6, and includes a fixed feed 21 mounted on a stand 22 extending from the base 6, whereby the reflector 4 is pivoted independently of the fixed feed 21. In the illustrated embodiment the reflector 4 is rotatable about the cross-elevation axis XEA, although rotation, i.e. steering, about either axis XEA and EA or a combination thereof is possible. An incident wave 23 is reflected at an angle $\Phi_i+\Phi_r$ from its original direction. For values of the ratio: focal length of the reflector (F) over diameter of the reflector (D) exceeding 0.5, $\Phi_i$ approximately equals $\Phi_r$. Accordingly, rotation of the reflector 4 by $\Phi_i$ around the cross-elevation axis XEA results in the reception of an incident wave that is $2\Phi_i$ from the vertical. Therefore, the scanning angle is doubled for a given rotation of the reflector 4, which increases the range of adjustability and enables faster response times. Unlike standard mounting arrangements, in which the axes of rotation are offset from the center of the reflector 4, which makes fixed feeds impractical, the center of the rotational motion in the illustrated embodiment is the center of the reflector 4.

We claim:

1. A gimballed reflector mounting device comprising:
   a base for supporting the device;
   a yoke, rotatable about a first axis, having a first and a second end;
   a first motor mounted on the base for rotating the yoke about the first axis;
   a reflector pivotally mounted to the first and second ends of the yoke about a second axis;
   a second motor mounted on the yoke for rotating the reflector about the second axis;
   a universal coupling, supported by the base, disposed at an intersection of the first and second axes for pivotally supporting the reflector.

2. The device according to claim 1, wherein the second axis is pivotable about the first axis.

3. The device according to claim 1, wherein the first axis extends through the center of an arc defined by the yoke, parallel to the base and perpendicular to the second axis.

4. The device according to claim 3, wherein the yoke is semi-circular.

5. The device according to claim 1, wherein the universal coupling comprises a ball joint.

6. The device according to claim 5, wherein the ball joint is supported by a pedestal extending substantially perpendicularly from the base along an axis perpendicular to the first axis.

7. The device according to claim 5, wherein the reflector includes a semi-spherical indentation for receiving the ball joint.

8. The device according to claim 7, further comprising a mounting collar secured to said reflector having an opening with a diameter smaller than the diameter of said ball joint for holding the ball joint in the semi-spherical indentation.

9. The device according to claim 1, wherein the reflector is substantially circular; and wherein the universal coupling supports the reflector at the center thereof.

10. The device according to claim 9, wherein the universal coupling is supported by a pedestal extending substantially perpendicularly from the base along an axis perpendicular to the first axis.

11. The device according to claim 9, further comprising a feed for receiving a signal collected by the reflector, the feed being fixed relative to the base, whereby the reflector rotates relative to the feed.

12. The device according to claim 1, wherein the reflector comprises a flat plate antenna or a parabolic dish antenna.

13. The device according to claim 1, wherein the second motor is mounted proximate the first end of the yoke; and further comprising a counterweight or a third motor mounted proximate the second end of the yoke for counter balancing the second motor.

14. The device according to claim 1, wherein the yoke includes a plurality of gear teeth for engaging the first motor during rotation thereof.

15. The device according to claim 14, wherein the gear teeth are radially extending from the yoke.

* * * * *